Figure 4:
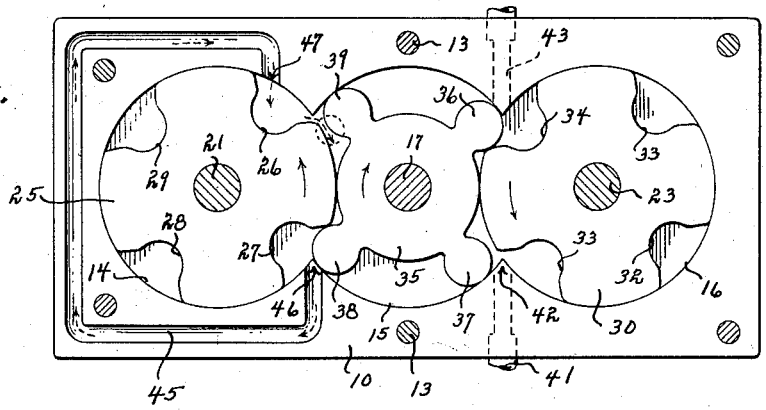

Jan. 20, 1959 — D. F. MAREAN — 2,869,522
INTERNAL COMBUSTION ROTARY ENGINE
Filed April 18, 1956 — 2 Sheets-Sheet 1
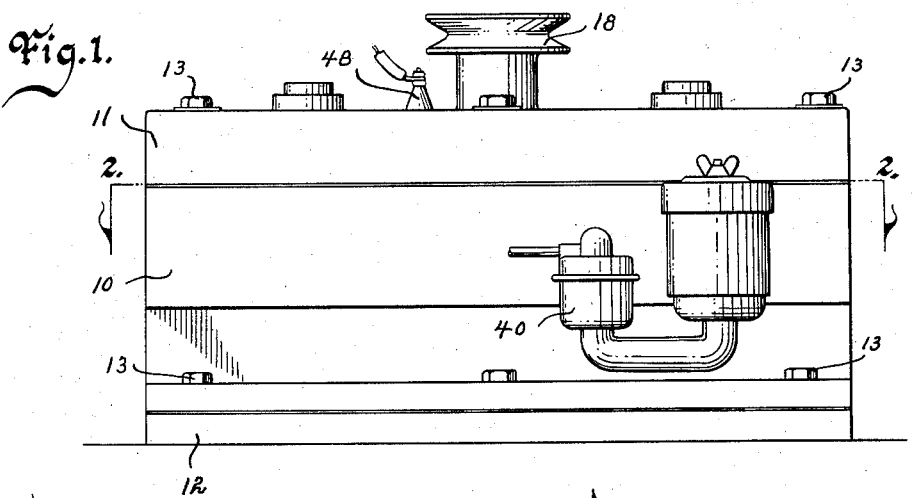
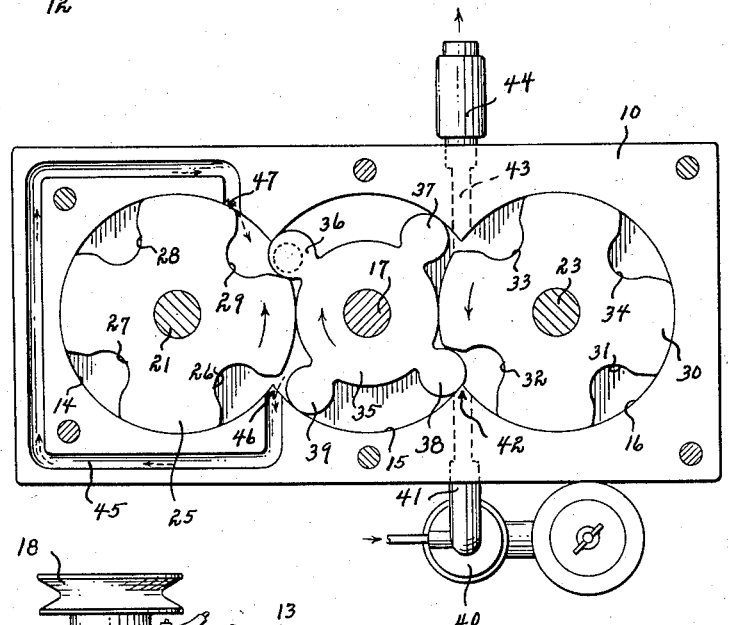
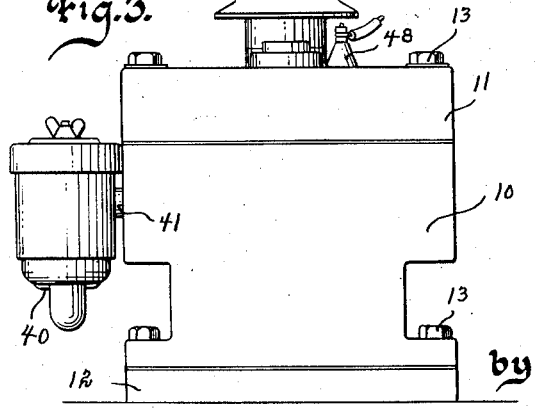
Inventor
Dale F. Marean Jan. 20, 1959  D. F. MAREAN  2,869,522
INTERNAL COMBUSTION ROTARY ENGINE
Filed April 18, 1956  2 Sheets-Sheet 2

Witness
Edward P. Seeley

Inventor
Dale F. Marean
by M. Talbert Dick
Attorney 2,869,522
Patented Jan. 20, 1959

2,869,522
INTERNAL COMBUSTION ROTARY ENGINE
Dale F. Marean, Inglewood, Calif.

Application April 18, 1956, Serial No. 579,036

3 Claims. (Cl. 123—12)

This invention relates to motors and more particularly to internal combustion ones of the rotary type.

Most internal combustion engines are of the reciprocating piston type. Such motors are of two or four cycle, the four cycle being the most popular and firing once per cylinder for each two complete revolutions of the crank shaft. Obviously, both the exhaust valves and the intake valves must be synchronized with and powered from the crank shaft. A spark plug is provided for each combustion chamber. Such engines are complicated, have many working parts and are highly inefficient. Considerable power is lost in just raising the valves against the valve springs. Furthermore, such engines have a given speed at which they function best. Any speed above or below this set speed seriously affects operation. If the engine is operated at high speed, the valve springs do not close the valves fast enough. If the strength of the valve springs is increased, the motor is not strong enough to compress them at low speeds. As a matter of fact, such engines must always be a compromise. Therefore, considerable attention has been given of late in the development of a rotary internal combustion engine. However, such rotary engines have followed two distinct types, i. e., the rotary pump system, and the rotary fan system. The pump system has been confounded by the necessary compression phase and the expelling of burned gases. The fan system, on the other hand, encounters slippage and great fuel costs. My invention relates to the rotary motor pump system having meshing rotors.

Therefore, one of the principal objects of my invention is to provide an efficient rotary engine having meshing rotors and means for compressing and exhausting the fuel charge.

A further object of this invention is to provide an engine that has a plurality of explosions during one revolution of its drive shaft.

A still further object of my invention is to provide a rotary combustion engine that needs only one spark plug.

A still further object of my invention is to provide an internal combustion engine that has no valve springs, no crank shaft, and no reciprocating parts.

A still further object of my invention is to provide a light weight engine having few movable parts.

Still further objects of this invention are to provide an internal combustion engine that is economical in manufacture, durable in use, and refined in appearance.

These and other objects will be apparent to those skilled in the art.

Figure 5:
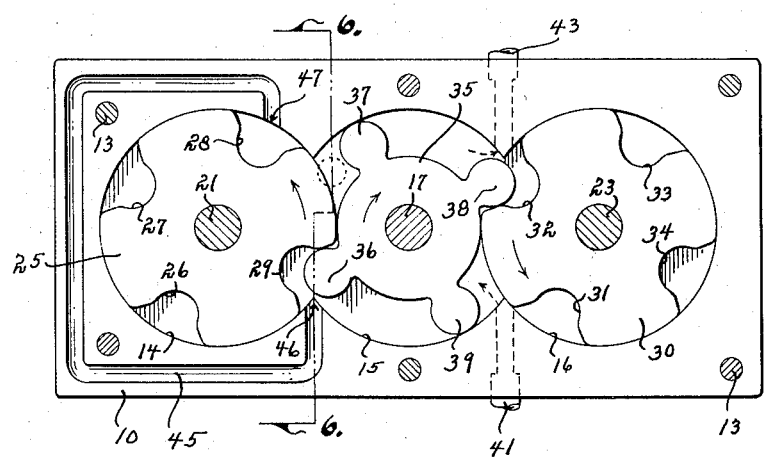
Figure 6:
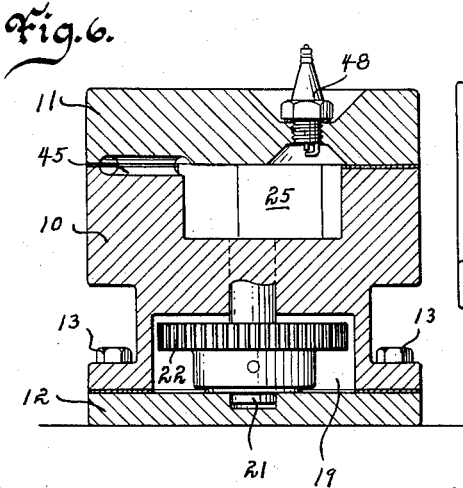
Figure 7:
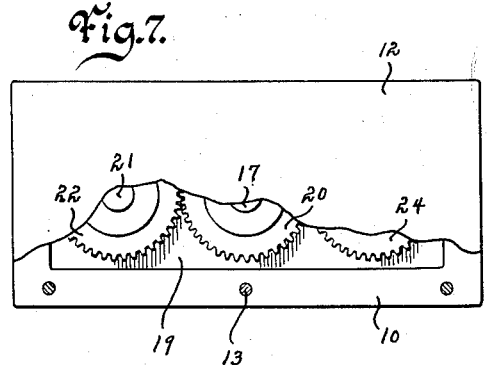

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view of my engine ready for use,

Fig. 2 is a longitudinal horizontal sectional view of the motor taken on line 2—2 of Fig. 1, Fig. 3 is an end view, Fig. 4 is a longitudinal horizontal sectional view showing the engine at one of its intake positions, Fig. 5 is a longitudinal horizontal sectional view showing the engine at one of its explosion positions, Fig. 6 is a cross sectional view of my engine taken on line 6—6 of Fig. 5, and more fully illustrates its construction, and Fig. 7 is a side sectional view showing the gearing of the three rotors together.

In these drawings I have used the numeral 10 to designate the motor block having the top head 11 and bottom 12. These three parts are held together by cap screws 13. In the motor block are three connecting wells 14, 15, and 16, as shown in Fig. 2. In the center of the well 15 is the vertical drive shaft 17 rotatably extending through the block in both directions. Secured to the top portion of the shaft 17 and above the head 11 is a power take-off means such as a pulley wheel 18. The lower end portion of the shaft 17 extends into a common space area 19 in the bottom portion of the block, as shown in Fig. 7. The numeral 20 designates a spur gear secured to the lower end portion of the shaft 17 and inside the area 19. The numeral 21 designates a vertical shaft in the center of the well 14 and rotatably mounted through the bottom portion of the block and the head 11. The numeral 22 designates a spur gear on the shaft 21 in the space 19 and in mesh with the gear 20. The numeral 23 designates a vertical shaft in the center of the well 16 and rotatably mounted through the bottom of the block and the head 11. The numeral 24 designates a spur gear on the lower end portion of the shaft 23 in the space 19 and in mesh with the spur gear 20. The numeral 25 designates a rotor on the shaft 21, in the well 14. This rotor has four equally spaced apart peripheral grooves 26, 27, 28 and 29. The numeral 30 designates a rotor on the shaft 23 and in the well 16. This second rotor has four equally spaced apart peripheral grooves 31, 32, 33 and 34. The numeral 35 designates the center rotor on the shaft 17 and in the well 15. This third rotor 35 has four equally spaced apart periphery tooth projections 36, 37, 38 and 39. These circular projections 36, 37, 38 and 39 are adapted to mesh in the grooves 26, 27, 28, 29, 31, 32, 33 and 34, as shown in Fig. 4. Obviously these rotors 25, 30 and 35, are rotatably mounted in the connecting wells 14, 15 and 16, and their extreme peripheries closely engage the well walls, as shown in Fig. 4. For tighter fits, resilient seal rings and bars may be used. The numeral 40 designates an ordinary carburetor adapted to be in communication with a source of fuel such as gasoline. The intake manifold 41 of this carburetor communicates with the adjacent wells 15 and 16 at a point where they join each other and which point is designated by the number 42. The numeral 43 designates the exhaust manifold communicating with the wells 15 and 16 at the point where they join, opposite from the point 42, as shown in Fig. 2. The numeral 44 designates the usual muffler. The numeral 45 designates a conduit formed in the block and head having one end communicating with the wells 14 and 15 where they join and which point is designated by the numeral 46, and its other end communicating with the well 14 at a substantially opposite point from the point 46 and which is designated by the numeral 47. This point 47 is near where the two wells 14 and 15 join on the opposite side, but prior to the point of joining, as shown in Fig. 2. The numeral 48 designates a common spark plug communicating with the well 15 just past the point 47. This spark plug is adapted to be electrically connected to a source of electricity and suitable distributor and timer (not shown).

The practical operation of my engine is as follows:

Referring to Fig. 5 as the lug 39 of the rotor 35 moves clockwise, with the sealing rotor 30, the fuel charge will be drawn into the space between the lugs 39 and 38. The space between the lugs 39 and 36 has in a like manner been just previously filled with a fuel charge. As the rotor 35 rotates, the lug 36 will seal with the notch 29 of the rotor 25 and thus the area between the lugs 39 and 36 will be progressively reduced, thereby compressing the charge and passing it through the conduit 45. By the time the lug 39 enters the notch 26 of the rotor 25 all the compressed charge will be passed into the conduit 45 and the charge will have passed into the cavity 29 and thence back into the space back of the lug 36, as shown in Fig. 4. The rotor 25 turns to the left and as soon as the cavity 29 closes from the well 14, the spark plug fires the charge thereby drawing the lug 36 to the right. However, by this time the lug 37 is in the cavity 33 of the rotor 30 and sealing with the rotor 30. Thus as the lug 36 moves to the right the fired charge will be scavenged through the exhaust manifold 43. This, however, only explains a one-fourth of the operation inasmuch as each following lug of the rotor 35, by cooperating with its leading and following lugs and the sealing rotors 25 and 30, repeats the same procedure. Thus, there are four intakes, four compressions, four explosions, and four exhausts for every complete rotation of the drive shaft 17. This makes for a very even and smooth running engine. There are no exhaust or intake valves to lift or close by spring means. Only one spark plug is needed. All rotors have one continuous direction of rotation. There are no reciprocating parts. The rotors take the place of a fly wheel, pistons, piston rods, crank shafts, and movable valves and their springs. These rotors may have a different number of lugs and cavities than that shown.

Some changes may be made in the construction and arrangement of my internal combustion rotary engine without departing from the real spirit and purpose of my invention, and it is my intention to cover by my claims, any modified forms of structure or use of mechanical equivalents which may be reasonably included within their scope.

I claim:

1. In a rotary combustion engine, a housing, a center well in said housing, a second well in said housing communicating with one side of said center well, a third well in said housing communicating with the other side of said center well, a shaft rotatably mounted in each of said wells, a rotor on the shaft rotatably mounted in said center well, a plurality of evenly spaced apart lugs on said rotor, a shaft rotatably mounted in said second well, a rotor having a plurality of evenly spaced apart notches and on said last mentioned shaft, a shaft rotatably mounted in the third well, a rotor having a plurality of evenly spaced apart notches and on said last mentioned shaft, a fuel inlet manifold adapted to be in communication with a source of fuel, communicating at one side point where said center and second wells communicate with each other, an exhaust outlet manifold communicating at the other side point where said center and second wells communicate with each other, a conduit having its entrance end communicating with one side point where said center and third wells communicate with each other and its exit end communicating with the other side of said third well just prior to where it communicates at that side with said center well; said entrance end of said conduit being on the same side as said fuel inlet manifold, and a fuel firing means communicating with said center well near the exit end of said conduit.

2. In a rotary combustion engine, a housing, a center well in said housing, a second well in said housing communicating with one side of said center well, a third well in said housing communicating with the other side of said center well, a shaft rotatably mounted in each of said wells, a rotor on the shaft rotatably mounted in said center well, four lugs on said rotor, a shaft rotatably mounted in said second well, a rotor having four notches and on said last mentioned shaft, a shaft rotatably mounted in the third well, a rotor having four notches and on said last mentioned shaft, a fuel inlet manifold adapted to be in communication with a source of fuel, communicating at one side point where said center and second wells communicate with each other, an exhaust outlet manifold communicating at the other side point where said center and second wells communicate with each other, a conduit having its entrance end communicating with one side point where said center and third wells communicate with each other and its exit end communicating with the other side of said third well just prior to where it communicates at that side with said center well; said entrance end of said conduit being on the same side as said fuel inlet manifold, and a fuel firing means communicating with said center well near the exit end of said conduit.

3. In a rotary combustion engine, a housing, a center well in said housing, a second well in said housing communicating with one side of said center well, a third well in said housing communicating with the other side of said center well, a shaft rotatably mounted in each of said wells, a rotor on the shaft rotatably mounted in said center well, four lugs on said rotor, a shaft rotatably mounted in said second well, a rotor having four notches and on said last mentioned shaft, a shaft rotatably mounted in the third well, a rotor having four notches and on said last mentioned shaft, a fuel inlet manifold adapted to be in communication with a source of fuel, communicating at one side point where said center and second wells communicate with each other, an exhaust outlet manifold communicating at the other side point where said center and second wells communicate with each other, a conduit having its entrance end communicating with one side point where said center and third wells communicate with each other and its exit end communicating with the other side of said third well just prior to where it communicates at that side with said center well; said entrance end of said conduit being on the same side as said fuel inlet manifold, a fuel firing means communicating with said center well near the exit end of said conduit, and a means for operatively connecting said shafts together for holding the lugs of the rotor in said center well in mesh with the notches in said other two rotors.

References Cited in the file of this patent

UNITED STATES PATENTS

| 789,921 | Langford | May 16, 1905 |
| 1,071,342 | Prall | Aug. 26, 1913 |
| 2,246,235 | Beach | June 17, 1941 |
| 2,766,737 | Sprinzing | Oct. 16, 1956 |